(12) United States Patent
Johnson et al.

(10) Patent No.: US 6,968,326 B2
(45) Date of Patent: Nov. 22, 2005

(54) SYSTEM AND METHOD FOR REPRESENTING AND INCORPORATING AVAILABLE INFORMATION INTO UNCERTAINTY-BASED FORECASTS

(75) Inventors: Blake Johnson, Mountain View, CA (US); Dario Benavides, Mountain View, CA (US); Antje Kann, Mountain View, CA (US)

(73) Assignee: Vivecon Corporation, Mountain View, CA (US)

( * ) Notice: Subject to any disclaimer, the term of this patent is extended or adjusted under 35 U.S.C. 154(b) by 99 days.

(21) Appl. No.: 10/621,645

(22) Filed: Jul. 17, 2003

(65) Prior Publication Data

US 2004/0236709 A1 Nov. 25, 2004

Related U.S. Application Data

(60) Provisional application No. 60/396,914, filed on Jul. 17, 2002.

(51) Int. Cl.[7] .............................................. G06F 15/18
(52) U.S. Cl. .............................. 706/14; 706/12; 706/61
(58) Field of Search ............................ 706/14, 12, 61; 705/400

(56) References Cited

U.S. PATENT DOCUMENTS

| | | | | |
|---|---|---|---|---|
| 5,768,284 A | * | 6/1998 | Cox | 379/114.04 |
| 6,125,355 A | * | 9/2000 | Bekaert et al. | 705/36 |
| 6,216,956 B1 | * | 4/2001 | Ehlers et al. | 236/47 |
| 6,493,682 B1 | * | 12/2002 | Horrigan et al. | 705/36 |
| 2002/0165816 A1 | * | 11/2002 | Barz | 705/37 |
| 2003/0014355 A1 | * | 1/2003 | Browne et al. | 705/38 |
| 2004/0128261 A1 | * | 7/2004 | Olavson et al. | 705/400 |
| 2005/0004858 A1 | * | 1/2005 | Foster et al. | 705/36 |

OTHER PUBLICATIONS

Bradley University, Black–Scholes—Option Pricing Models, 2004, http://www.bradley.edu/~arr/bsm/pg01.html.*

Julio J. Lucia et al, Electricity prices and power derivatives: Evidence from the Nordic power Exchange, 2000, University of California, Los Angeles, Anderson School of Management, 1–42.*

Mean Reversion Models, http://sphere.rdc.puc-rio.br/marco.ind/revers.html.*

Pierre Patie, On the First Passage Times of Generalized Ornstein–Uhlenbeck Process, Credit Suisse Group, 1–18.*

Bradley University, Black–Scholes–Option Pricing Models.

* cited by examiner

*Primary Examiner*—Joseph P. Hirl
(74) *Attorney, Agent, or Firm*—Carr & Ferrell LLP

(57) ABSTRACT

A system and method for representing and incorporating available information into uncertainty-based forecasts is provided. The system comprises a new class of models able to efficiently and effectively represent uncertainty-based forecasts with a wide range of characteristics with greater accuracy. Further, methods provide for selection of a most appropriate model from the class of models and calibration of the selected model to all available data, including both directly relevant historical data and expert opinion and analysis. An output is a model that can be used to generate an uncertainty-based forecast for a variable or variables of interest accurately and efficiently. In addition, methods for refining input data and testing and refining the output representation of the uncertainty-based forecast are provided.

26 Claims, 5 Drawing Sheets

SYSTEM AND METHOD FOR REPRESENTING AND INCORPORATING AVAILABLE INFORMATION INTO UNCERTAINTY-BASED FORECASTS

CROSS REFERENCES TO RELATED APPLICATIONS

This application claims priority and benefit of U.S. Provisional Patent Application Ser. No. 60/396,914 entitled "System and Method for Representing and Incorporating Available Information Into Scenario-Based Forecasts," filed on Jul. 17, 2002, which is also hereby incorporated by reference.

BACKGROUND OF THE INVENTION

1. Field of the Invention

The present invention relates generally to the field of forecasting uncertain future events, and more particularly to a system and method for representing and incorporating available information into uncertainty-based forecasts.

2. Description of Related Art

Many important economic variables, such as demand, supply, and price of materials and products, evolve over time in a way that cannot be perfectly predicted, but about which relevant information is available. This information may take the form of relevant historical data and expert opinion (frequently based on or augmented by various forms of analysis and modeling).

For example, economic variables commonly exhibit trends or cycles over time, driven by factors including temporal or seasonal patterns in supply or demand, product or technology lifecycles, and cycles or trends in relevant competitive or economic environment. In most such cases, relevant but incomplete information about the characteristics of these trends or cycles (e.g., distribution of their start time, size, shape, and duration and their variability over time) is available. The nature and extend of this information defines a level of uncertainty about future values of the variable or variables of interest.

To make decisions which depend on or relate to the future value of such uncertain variables effectively, it is vital to be able to effectively utilize all available information about likely future values of the variables. For decision-making purposes, information of this kind is typically captured in the form of forecasts of the relevant variable(s). The forecast constructed may be deterministic, representing a single "best guess" of the values of the variable(s) over future periods, or may be uncertain and comprised of multiple prospective sets of values over future periods, with each associated "scenario" or sample path of possible events over time assigned a relative likelihood of occurrence.

The later type of forecast (hereinafter referred to as "uncertainty-based forecast) is able to incorporate significantly more information than a deterministic forecast, since the uncertainty-based forecast is able to reflect, among other things, available information about 1) a range of outcomes that may occur at each future point in time and their relative likelihood and 2) relative likelihood of future values of the variable(s) of interest at future points in time conditional on their actual values prior to that time, as well as other data and expert opinion and analysis that will be available at that time.

While an ability to capture this wide range of information is an important benefit of uncertain-based forecasts, in order for this benefit to be realized, efficient methods of incorporating all such relevant information into an uncertainty-based forecast, and of efficiently updating and revising this uncertainty-based forecast as new information becomes available, are required. Disadvantageously, prior art systems and methods are unable to accurately or efficiently represent uncertainty-based forecasts. Furthermore, prior art systems and methods are unable to efficiently and effectively incorporate available information form diverse sources into uncertainty-based forecasts, including both directly relevant historical data and expert opinion and analysis.

One method of representing uncertainty-based forecasts is through the use of a mathematical or statistical model. A benefit of representing the uncertainty-based forecast with a model is the relative ease of working with the model in contrast to working directly with individual values of an uncertainty-based forecast that is represented, for example, by exhaustive enumeration or in uncertainty tree form (i.e., forms that require direct interaction with and manipulation of large amounts of data). A mathematical or statistical representation of the uncertainty-based forecast is generally comprised of only a model structure and a set of values for the associated parameters of the model, which together may be used to generate a representation of the uncertainty-based forecast as required.

Key challenges associated with using models to represent uncertainty-based forecasts include identification or construction of the model structure capable of accurately representing the uncertainty-based forecast of interest, and determination of the parameter values of the selected model so that the representation of the uncertainty-based forecast generated by the model accurately reflects all available information about the uncertainty-based forecast. Thus, the use of a model to represent a particular uncertainty-based forecast, while potentially powerful, is only practical if both of these challenges can be overcome.

Therefore, there is a need for a system and method for forecasting uncertain future events by representing and incorporating available information into uncertainty-based forecasts.

SUMMARY OF THE INVENTION

The present invention provides a system and method for representing and incorporating available information into uncertainty-based forecasts. The system comprises an uncertainty-based forecast generator for generating uncertainty-based forecasts based on the available information. In one embodiment, the uncertainty-based forecast generator further comprises or is coupled to a data cleanup module, a model module, a parameter module, a model and parameter storage, and a data processing module. The data cleanup module refines the input data, checks for errors, and sorts the input data. The model module generates models which are able to efficiently and effectively represent uncertainty-based forecasts with a wide range of characteristics with greater accuracy, while the parameter module generates parameter values for the selected model. The selected model and corresponding parameter values are then stored in a model and parameter storage, and processed by the data processing module to generate the uncertainty-based forecast.

Further, methods provide for selection of a most appropriate model from the class of models and determination of the most appropriate parameter values of the selected model utilizing all available data, including both directly relevant historical data and expert opinion and analysis. In a first step, the type of available information is determined. The information may be user provided or extracted from other sources of data. Subsequently, at least one proper model from the model module is selected. In one embodiment, locally mean-reverting-diverting family of models is utilized to more accurately represent a broad range of uncertainty-based forecasts. Next, appropriate parameter values are determined according to the model selected. The determination process may further comprise incorporation of available information into the selection of the parameter values of the model, thus resulting in the selection of parameter values which allow the selected model to generate a representation of the uncertainty-based forecast that is most consistent with the available information. In addition, methods for refining the input data and testing and refining the output representation of the uncertainty-based forecast are provided.

DESCRIPTION OF THE EXEMPLARY EMBODIMENTS

Figure 1:
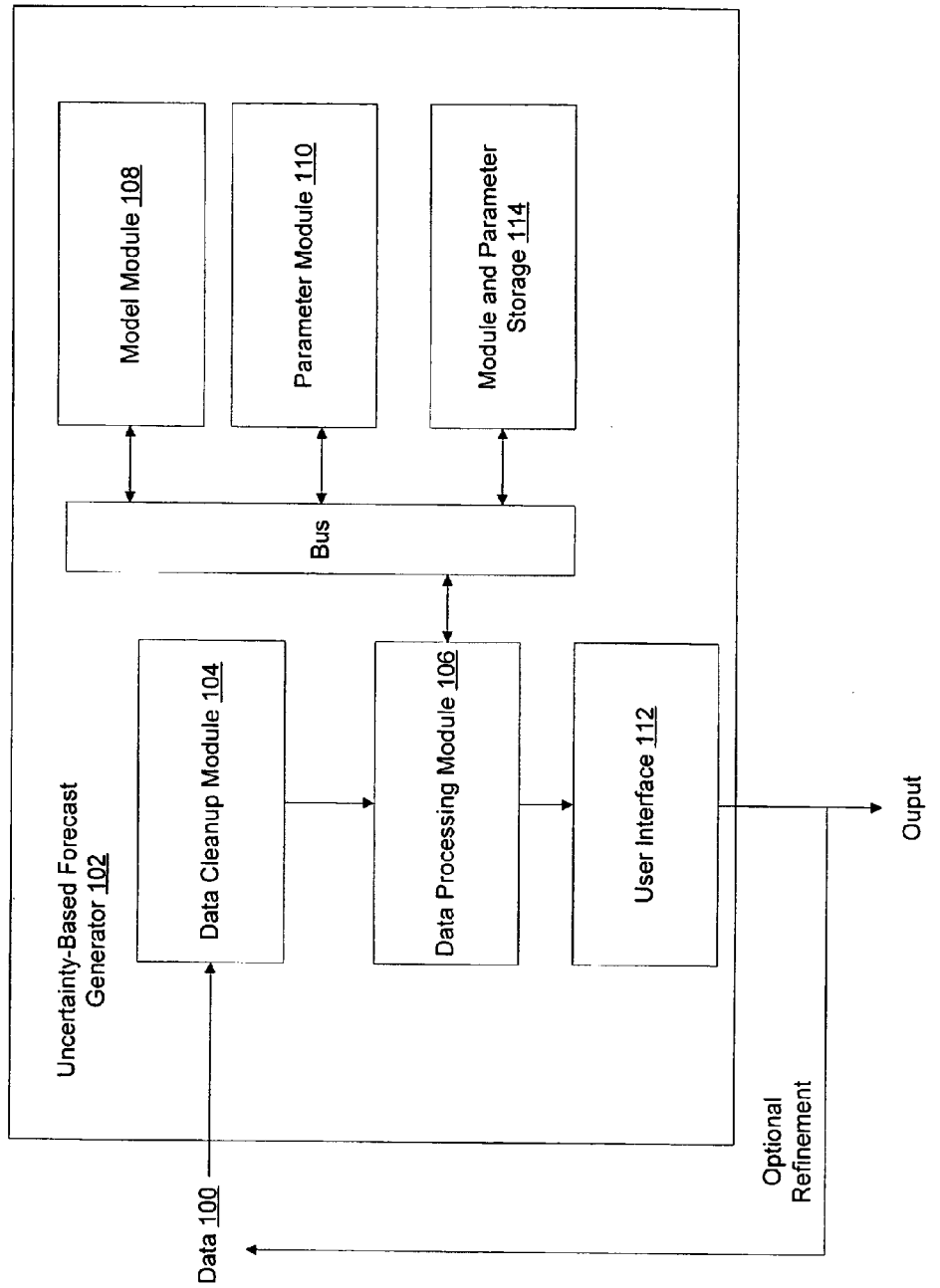
FIG. 1 is a block diagram of an exemplary uncertainty-based forecast generator in accordance with an embodiment of the present invention.

The present invention provides a system and method for representing and incorporating available information into uncertainty-based forecasts Referring now to FIG. 1, an overview of an exemplary architecture for representing and incorporating available information into uncertainty-based forecasts is shown. Initially, data 100 is input into the system. These inputs may be provided directly by a user. Alternatively, the inputs may be extracted from other sources such as graphs, charts, spreadsheets, etc. received from the user or other computing systems.

The inputs 100 may comprise any inputs related to any type of uncertain future sequence of events to be forecasted. For example, the user may input data related to historical product sales, when a product is expected to launch, effect of time of year on product sales, or any other data suitable for use in forecasting future sales of a product (e.g., materials, services, etc.) in accordance with the present invention. For instance, information related to popularity (e.g., technology life cycle) of personal digital assistants may be input. Alternatively, market cycle data may be input in a further example. Essentially, the user can input data relating to whatever knowledge the user might have about the uncertain future sequence of events to be forecasted.

Generally, the user inputs 100 fall into two general categories: (1) directly relevant historical data and (2) expert opinion and analysis. Directly relevant historical data represents any type of available data that can be used directly in construction of uncertainty-based forecasts. Examples may include actual data about behavior of similar variables under similar past circumstances. More specifically, directly relevant historical data may be data judged to be directly relevant to the uncertainty-based forecast being forecasted, enabling direct use as an input without prior expert modification, to a process of choosing a most appropriate model and determining the most appropriate parameter values for that model. Directly relevant historical data may be utilized in construction of the representation of an uncertainty-based forecast by evaluating its statistical characteristics, and using these characteristics to guide selection of related statistical characteristics of the uncertainty-based forecast.

Expert opinion and analysis can include any type of data offered, extracted, etc. from a professional in a related field, including output of various models or other forms of analysis an expert may employ, as well as the expert's judgment. Both the opinions and conclusions directly, and any relevant models and analysis which they draw on, may in turn draw on directly relevant historical data, as well as other sources of data. Any source of expert opinion and analysis may be utilized that is suitable for use with the present invention. For example, percentiles pertaining to a distribution of a variable or variables being forecast at individual points in time, or a conditional distribution of the variable or variable being forecast at future points in time given actual values of the variable or variables at prior points in time may be utilized. A conditional distribution is a mathematical term for a probability distribution of a random variable that has been updated from its "unconditional" state based on subsequent availability of specific additional "conditioning" information about the distribution.

Further, expert opinion and analysis may include multiple representative prospective forecast scenarios, or sample paths. This includes scenarios or sample paths generated by an expert and judged to be directly representative of the uncertainty-based forecast to be generated.

Once all forms of information relevant to an uncertainty-based forecast have been identified, an efficient method for utilizing this information to generate uncertainty-based forecasts is required. An ability to incorporate all available information into an uncertainty-based forecast is required both when the forecast is first constructed and over time as new information arrives.

In the present invention, the inputs are forwarded to the uncertainty-based forecast generator 102 and filtered through a data cleanup module 104. Any conventional data cleanup method may be employed to refine the data inputs via the data cleanup module 104. For example, directly relevant historical data may be checked for errors or may be sorted based on specified criteria. Expert opinion and analysis may be checked for consistency and completeness.

Subsequently, the refined data is forwarded to a data processing module 106. The data processing module 106 has access to, and is capable of exchanging data with, a model module 108, a parameter module 110 and a model and parameter storage 114 in which the selected model and specific values for the parameters of the model are stored. Further, the data processing module 106 can manipulate the data in a variety of ways. For example, the data processing module 106 may utilize an algorithm to select a model in the model module 108 for the particular set of data, determine the most appropriate parameter values for the model in the parameter module 110 and enter the model and parameter values in the model and parameter storage 114, etc.

The uncertainty-based forecast is then generated and provided to a user through the user interface 112. The user may then make changes via the user interface 112 by providing new or modified inputs or modifying the output.

Figure 2:
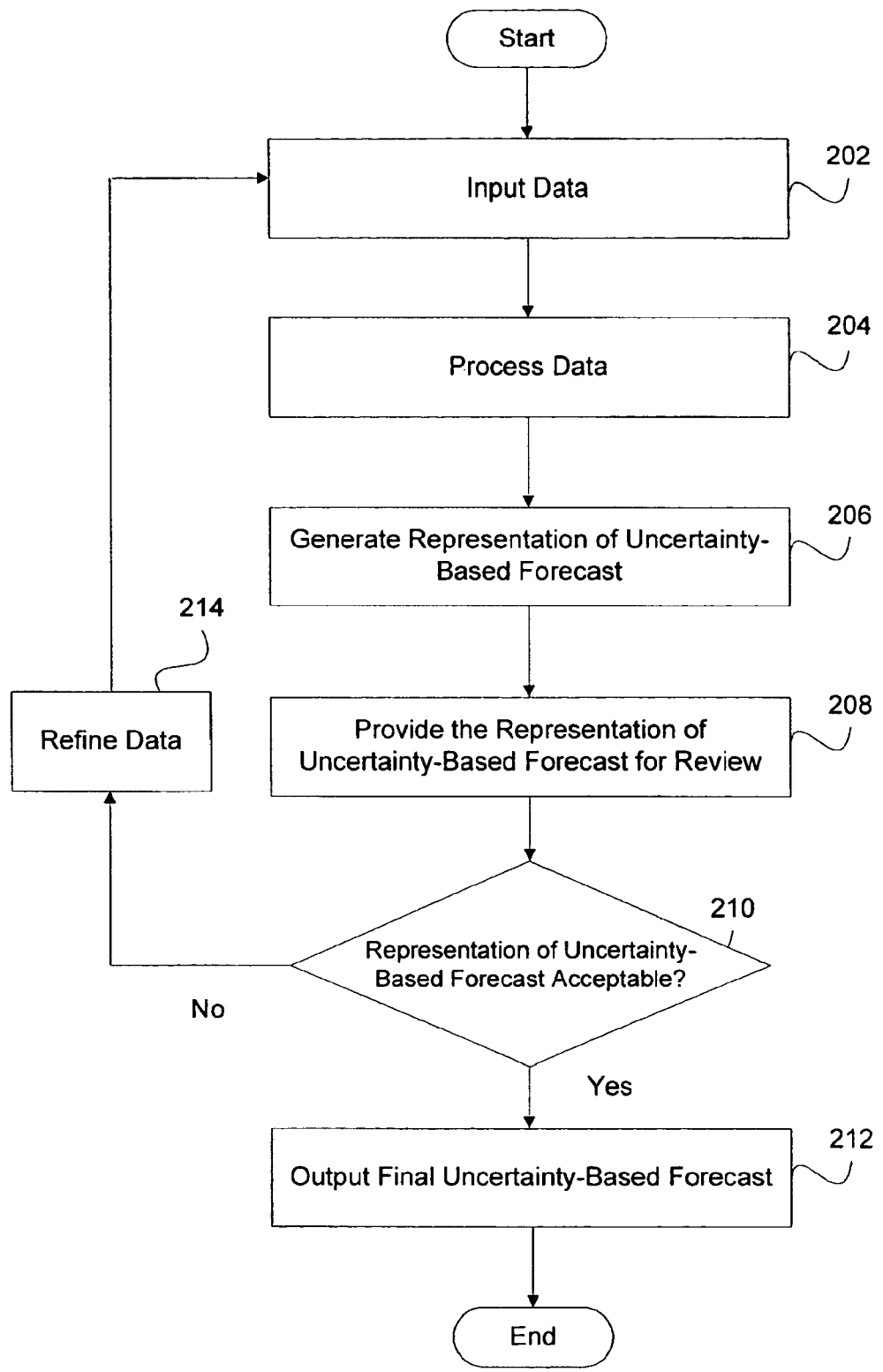
FIG. 2 is an exemplary flowchart of a method for representing and incorporating available information into uncertainty-based forecasts.

Referring now to FIG. 2, a flowchart illustrating an exemplary process for representing and incorporating available information into uncertainty-based forecasts is shown. At step 202, data is input. As previously discussed, the data may be provided directly from a user or may be extracted from other data sources. The input may include directly relevant historical data, expert opinion and analysis data, etc. (as discussed in connection with FIG. 1). The data is then processed in step 204. As discussed in FIG. 1, data processing may include any type of manipulation of the data, such as selecting the model and/or parameter values of the model, etc. In step 206, a representation of the uncertainty-based forecast comprised of at least one scenario or sample path from the uncertainty-based forecast is generated.

The representation of the uncertainty-based forecast generated is then provided to the user for review in step 208. The user must decide if the representation of the uncertainty-based forecast is acceptable in step 210. If the representation of the uncertainty-based forecast is acceptable, the representation is displayed/output to the user in step 212. However, where the representation of the uncertainty-based forecast is not acceptable to the user, the user may review the input data and refine the data at step 214. Briefly, the user can correct data that is incorrect for some reason. Further, the user can request that the expert opinion and analysis be altered, either by requesting that the expert providing the opinion and analysis review the data provided and properties of the representation of the uncertainty-based forecast, or by checking the source of the expert opinion and analysis, verifying the expert opinion and analysis by cross-referencing the data with another source, etc. The steps for refining and/or reviewing the input data are described in more detail in connection with FIG. 5. Subsequently, the refined data is processed again and a new representation of the uncertainty-based forecast is generated. In further embodiments, the user can alter the representation of the uncertainty-based forecast as well. Alternatively, the user may be presented with a final representation of the uncertainty-based forecast, as well as structure and parameters of the model used to generate the representation of the uncertainty-based forecast for later use in generating additional representations of the uncertainty-based forecast.

If the user is happy with the representation of the uncertainty-based forecast presented, the representation of the uncertainty-based forecast will be displayed/output in step 212. The user can access various types of data related to the representation of the uncertainty-based forecast. For example, the user may access a data file, or alter the manner of display, etc.

Figure 3:
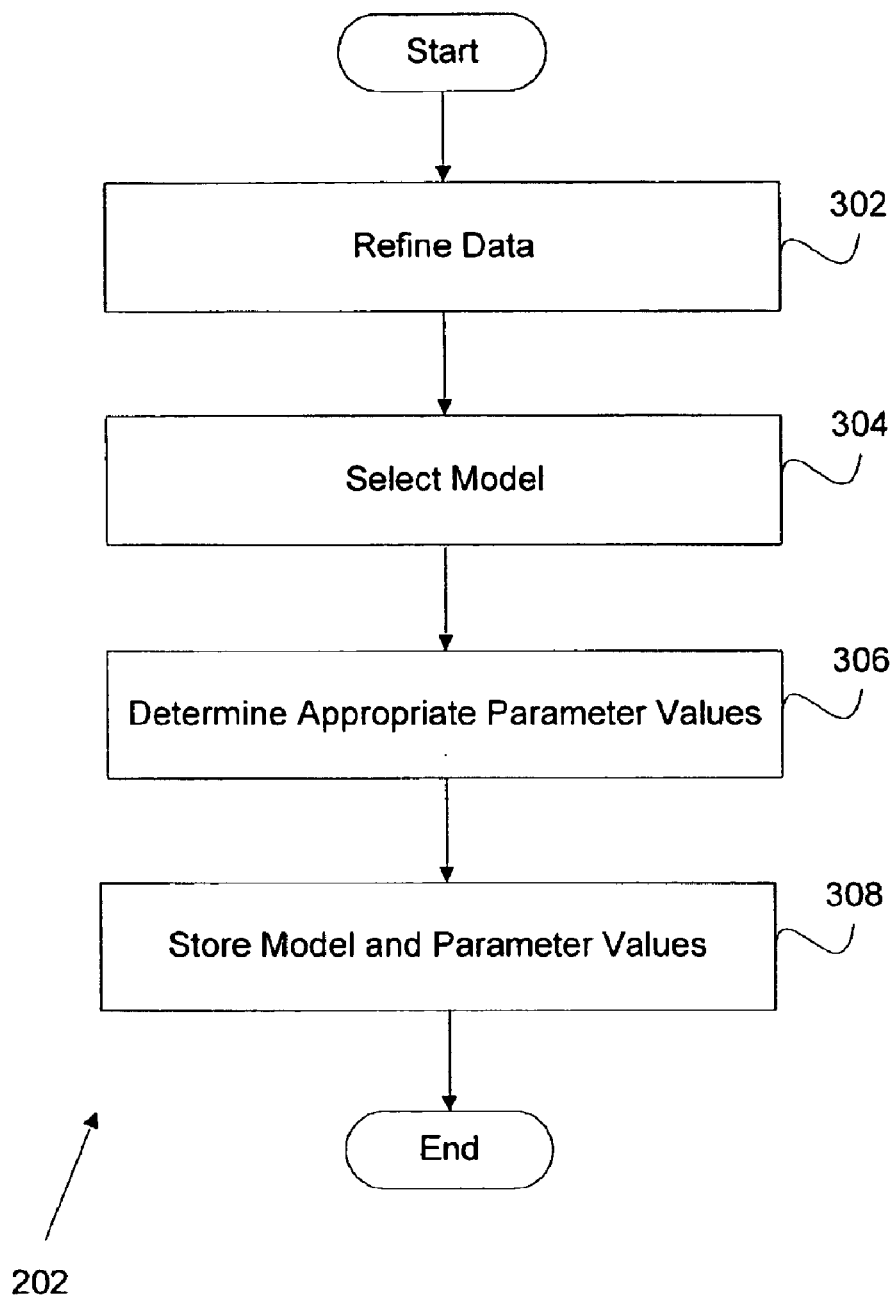
FIG. 3 is an exemplary flowchart of a method for processing input data.

Referring now to FIG. 3, a flowchart illustrating an exemplary method for processing the input data of step 204 (FIG. 2) is shown and described in further detail. As previously discussed input data is received in step 202 (FIG. 2). Data cleanup or refinement is then performed on the data by the data cleanup module 104 (FIG. 1) in step 302 (FIG. 3), such as normalization, etc.

Next, a model is selected from the model module 108 (FIG. 1) by the data processing module 106 (FIG. 1) according to the data input in step 304. In one embodiment of the present invention, the uncertainty-based forecasts are represented with a member of a new family of mathematical models, the locally mean-reverting-diverting family of models described more fully below, utilizing methods of determining the most appropriate form of model from the locally mean-reverting-diverting family of models and parameter values of the selected model form utilizing both directly relevant historical data and/or expert opinion and analysis, as described below. In combination, this new family of models and associated methods of determining the most appropriate form of model from this family of models and parameter values of the selected model form enable a broad range of uncertainty-based forecasts to be represented efficiently and accurately, irrespective of whether information from either or both directly relevant historical data and/or expert opinion and analysis is available.

Before describing the locally mean-reverting-diverting family of models in detail, it is useful to review the mean-reverting family of models.

The basic elements of the mean-reverting family of models are contained in the simplest forms of mean-reverting models, such as the "arithmetic" and "geometric" mean reversion models. Representative continuous-time versions of these model forms are:

$$dX = \kappa(\bar{x}-X)dt + \sigma dZ$$

$$dX = \kappa(\bar{x}-X)X dt + \sigma X dZ$$

Here $\kappa$ is the mean reverting parameter and $\bar{x}$ and $\sigma$ are, respectively, the mean to which the process reverts and the (instantaneous) standard deviation of the process, and $dZ$ is the standard normal Brownian motion process.

Extensions and modifications of these simple forms of mean-reverting models have been developed which enable information about the start time, shape, magnitude and duration of trends or cycles of an uncertainty-based forecast to be at least partially, or approximately, incorporated in the representation of the forecast. For example, one common extension of the standard mean-reverting model is to incorporate a time-varying mean. Doing so allows information about trends, cycles or seasonality in the mean value of the uncertainty-based forecast to be at least approximately represented, as discussed more fully below. A second category of extensions include time varying mean-reversion and/or volatility parameters. These provide some capability to incorporate information about the magnitude and duration of fluctuations in an uncertainty-based forecast, as illustrated in the discussion of the interactions between and combined effects of the mean-reversion and volatility parameters above. A third category of extensions include alterations or additions to a random term of the process, for example one or more alternative or additional terms with different distributions, as well as "jump" terms that occur with a Poisson or other "arrival" rate. Each of these extensions increase the type and amount of information that can be incorporated in the representation of an uncertainty-based forecast using a mean reverting process, while also increasing the complexity of both model selection and calibration.

The extended and modified forms of the mean-reverting family of models can more accurately represent certain but not all characteristics of many uncertainty-based forecasts, and are generally complex and time-consuming to select and to incorporate available information into. Overall, the practical utilization of the mean-reverting family of models is accordingly limited by both its fundamental, or structural inability to accurately represent a wide range of uncertainty-based forecasts, and by the practical challenge of incorporating available information into such models, whether information in the form of directly relevant historical data and/or expert opinion and analysis.

As a result, a need exists for a model or family of models that can accurately represent uncertainty-based forecasts with a wide range of characteristics, and for methods of easily and effectively incorporating available information into such model or family of models, whether information in the form of directly relevant historical data and/or expert opinion and analysis. The locally mean-reverting-diverting family of models and the methods for incorporating available information into such models presented below meet both of these requirements.

The locally mean-reverting-diverting family of models is created by extending the mean-reverting family of models to allow mean-diverting as well as mean-reverting behavior. This is accomplished by relaxing a constraint imposed in the mean-reverting family of models that the mean-reversion coefficient be greater than or equal to zero. In the locally mean-reverting-diverting family an equivalent coefficient may take on negative values over defined periods of time, as well as fluctuate between positive and negative values. This generalization enables a representation of processes that exhibit local mean diversion, and oscillating mean-reverting-diverting behavior, in addition to mean-reverting behavior. The nature of mean-diverting and oscillating mean-reverting-diverting behavior, importance of the ability to represent such behavior in order to accurately represent many uncertainty-based forecasts, and how such behavior is represented using locally mean-reverting-diverting models are described below.

Mean-diverting behavior refers to a divergence of variable values from the mean value of an uncertainty-based forecast. Thus the mean-diverting behavior represents precisely an opposite form of behavior as that represented by mean-reversion characteristics of prior models, which are only capable of representing a convergence of variable values toward the mean value of an uncertainty-based forecast. Since both mean-reversion and mean-diversion behavior are modeled with a "deterministic" term of a mean-reverting or diverting process (as opposed to a random term), the convergence or divergence they generate is deterministic in nature.

Because it is able to represent both mean-reversion and mean-diversion, the locally mean-reverting-diverting family of models is able to represent both widening and narrowing of distribution of values of an uncertainty-based forecast over time, as well as behavior that alternates between widening and narrowing at different points in time.

While it is technically possible to construct more complex and generally more problem-specific models that may also be capable of representing specific uncertainty-based forecasts that exhibit widening as well as narrowing of the distribution of variable values over time, for example by directly specifying unconditional and conditional distributions of a representation to match a widening and/or narrowing of a distribution of variable values over time (e.g., various "state dependent" models), these models are substantially more complex to construct and calibrate, and by their customized nature are much narrower in scope of application. The narrow nature of their scope of use and challenges associated with their practical utilization make such models significantly less valuable in practical application than the locally mean-reverting-diverting class of models.

Advantageously, the ability of the locally mean-reverting-diverting family of models to accurately represent a wide range of uncertainty-based forecasts with a single model type greatly facilitates the practical application of uncertainty-based forecasts by mitigating tasks of selecting or constructing a model capable of accurately representing a given uncertainty-based forecast and associated task of developing appropriate calibration methods for a model structure once selected. This representational capability, combined with ease with which the locally mean-reverting-diverting family of models enables this representational capability to be achieved, and breadth of application of the locally mean-reverting-diverting family of models (both of which are described more fully below) are the key distinctions and contributions of the locally mean-reverting-diverting class of models.

In the mean-reverting family of models, a constraint is imposed that requires a mean reversion coefficient to be greater than or equal to zero. This constraint is imposed because negative values of the coefficient cause values of a process to diverge from the mean value of the process, moving further above the mean (if already above the mean) or further below the mean (if already below the mean). If not appropriately controlled, this can result in arbitrarily large and small values.

Under the locally mean-reverting-diverting family of models, divergence of process values of this kind is avoided by restricting length of time over which the mean reversion coefficient is negative and/or limiting a magnitude of the coefficient. With a specific view to applications of the locally mean-reverting-diverting family of models to representation of uncertainty-based forecasts, risk of divergence of this kind is naturally contained through determination of the most appropriate parameter values of the model. Such appropriate calibration ensures that a sign and magnitude of a mean-reversion parameter over time are selected to provide the best possible representation of (presumably bounded) values of the uncertainty-based forecast the model is being used to represent.

While an impact of a deterministic term of a mean-reverting process is limited to causing variable values to revert toward their mean value at the next point in time (or a function thereof, depending on the specific form of the process), the deterministic term of a locally mean-reverting-diverting process can drive variable values either deterministically toward or away from their mean. This is important because although random term(s) of both the mean reverting family and locally mean-reverting-diverting family of models may be used to widen distribution of variable values, by a random nature of these terms any such widening these terms generate must occur in an uncertain or random way. In contrast, the deterministic term of a locally mean-reverting-diverting process enables distributions to be widened in a deterministic way.

By drawing jointly on both the deterministic and random terms of a locally mean-reverting-diverting process, models in the locally mean-reverting-diverting family may be used to represent widening and narrowing of the distribution of the values of an uncertainty-based forecast that occurs in a purely deterministic way, a purely random way, or any combination of these two extreme forms. The generalized nature of this capability allows a much wider range of both unconditional and conditional distributions of uncertainty-based forecasts to be represented, and thus a much wider range of uncertainty-based forecasts to be accurately represented.

Typically, selecting a specific model form from the family of locally mean-reverting-diverting models and determining the appropriate values of the parameters of the model selected entails selecting the model form and values for the parameters of the selected model form that allow a representation of the uncertainty-based forecast to be generated that is most consistent with the input data. To illustrate this process with a simple example, a model for normal distribution will generate a normal distribution, and the parameter values chosen for the model will define a mean and variance of the normal distribution generated.

Each time the input data is modified, or otherwise adjusted, both the most appropriate model form and the parameter values of the selected model may change. In addition, the most appropriate model and associated set of parameter values may change over a duration of a forecast period if characteristics of the variable or variables being forecast change over that period, which in general will occur.

The present invention enables a most appropriate model from the locally mean-reverting-diverting family of models to be identified automatically, and most appropriate values for the parameters of the identified model to be determined given available information in the form of directly relevant historical data, expert opinion and analysis, or any combination thereof.

In order to automate the identification of the most appropriate model from the locally mean-reverting-diverting family of models for use in representing a specific uncertainty-based forecast in step 304 (FIG. 3), the selection of the specific form of the random term of the locally mean-reverting-diverting model must be automated. This selection may be automated by analyzing a distribution of changes in variable values over specific periods of time implied by available information from directly relevant historical data and/or expert opinion and analysis, and selecting a structure of the random term of the model that best fits the distribution over such specific periods of time.

For example, if the distribution of changes in variable values during a specific time period suggested by available information closely approximates a normal or lognormal distribution, a normal or lognormal random term may be selected for that time period. As a second example, if the distribution instead has a greater number of extreme outcomes, a random term that also includes positive and/or negative jump terms may be selected to a better fit. A range of existing statistical methods, such as the matching of moments or maximum likelihood, may be utilized to evaluate the form of distribution that provides the best fit to the available information.

By selecting the form of the random term that best matches the distribution suggested by available information (i.e., input data) for individual periods of time, the optimal form of the random term of the model over time (which may be time-valying if the distribution suggested by available information varies over time) may accordingly be identified. Further, this process may be automated (e.g., by using a computer program to assess a fit of each of a set of prospective random terms during each time interval and selecting the term that provides the fit).

In step 306 (FIG. 3), the appropriate parameter values are determined according to the model selected in step 304. Parameter values may be determined based on available information. Methods of doing so when available information is comprised of only directly relevant historical data, only expert opinion and analysis, or both directly relevant historical data and expert opinion and analysis are presented below in connection with FIGS. 4 and 5.

Once the most appropriate model form (step 304) and parameter values of this model form have been successfully determined (step 306) and both have been stored (step 308), the user may choose to run the model multiple times (step 206) (FIG. 2) to generate and output multiple alternative representations of the uncertainty-based forecast for various purposes that may arise over time.

When only directly relevant historical data is available, existing statistical methods, such as maximum likelihood, can be used to determine the most appropriate parameter values of locally mean-reverting-diverting models. Specifically, existing methods of fitting the associated forms of mean reverting models can be applied, with the only change required being the removal of the constraint on the sign of the mean reversion coefficient incorporated in such methods.

Figure 4:
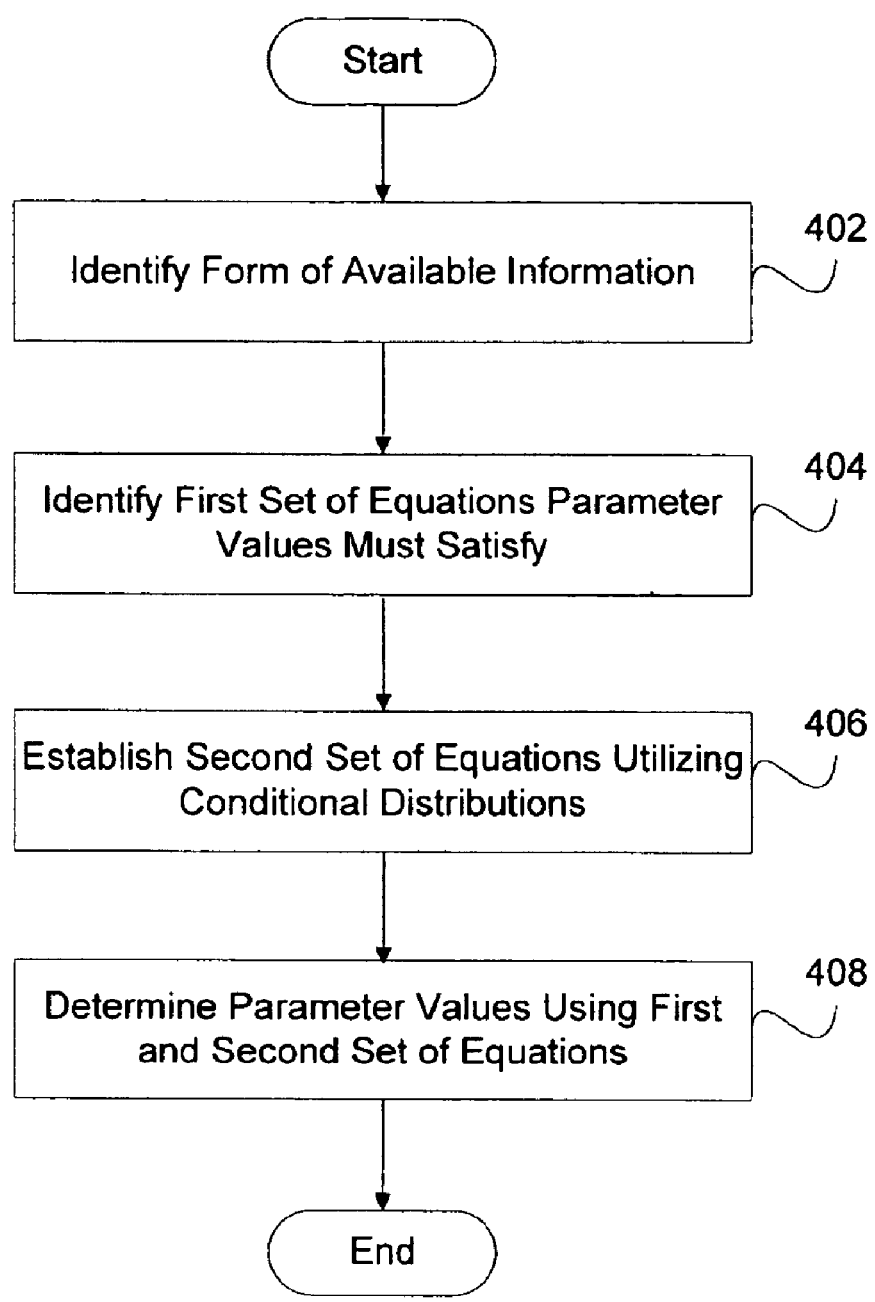
FIG. 4 is an exemplary flowchart of a method for determining parameter values of a model with available information from expert opinion and analysis.

Referring now to FIG. 4, a first step 402 in determining parameter values that utilize forms of information most commonly available from expert opinion or analysis is to identify those commonly available forms. These forms are described below based on the two categories of information represented in uncertainty-based forecast: 1) information about a range and relative likelihood of variable values at individual points in time, or the unconditional distributions of the uncertainty-based forecast, and 2) information about how variable values evolve over time, or the conditional distributions of the forecast.

It is common for information about a range and relative likelihood of variable values at individual points in time to comprise a majority of information available from expert opinion and analysis. This is true both because underlying data to support analysis of the unconditional distributions of an uncertainty-based forecast is generally more readily available, and because significantly less information is required to specify the unconditional distributions of an uncertainty-based forecast than to specify the much more numerous conditional distributions of the forecast.

Information from expert opinion and analysis about the unconditional distributions of an uncertainty-based forecast commonly takes a form of estimates of the mean, median, variance, or specific percentiles of the distribution of an uncertainty-based forecast at individual points in time over the forecast horizon. Estimates of these values from expert opinion and analysis will ideally reflect all available sources of information about the variable(s) available to the expert, for example information about seasonality, the effects of product, market or technology lifecycles, and magnitude and characteristics of past or likely future forecast error (for example upward or downward bias, symmetry or skewness, etc.) by forecast horizon.

In the second form, due to a large number of conditional distributions incorporated in an uncertainty-based forecast and their specific nature, it is less common for significant amounts of information about these distributions to be available from expert opinion and analysis. As a result, in order to be practically relevant, methods of determining the most appropriate parameter values of models for uncertainty-based forecasts must be able to effectively utilize information that is available about the conditional distributions of an uncertainty-based forecast, and where required, to facilitate efficient gathering of any additional data required to complete the determination of the most appropriate parameter values.

The forms of information about conditional distributions most commonly available include information about a degree of "predictability" or uncertainty of variable values over short time horizons, and in some cases, information about one or more characteristics of one or mores specific conditional distributions of an uncertainty-based forecast. Information about one or more characteristics of specific conditional distributions may include estimates of an (conditional) expected value, variance, percentile values, or other related information about the conditional distribution.

Alternatively in some circumstances, available information from expert opinion and analysis may be supplied in a form of a set of "scenarios" constructed to serve as representative "sample paths" of an uncertainty-based forecast.

When this is the case, if enough scenarios or sample paths have been estimated to allow statistical approaches described above for use with directly relevant historical data to be applied, the parameter values can be determined utilizing these approaches. If this is not the case, the available scenarios may be used to estimate the more limited forms of information typically available from expert opinion and analysis, as described above, and the methods for determining parameter values of locally mean-reverting-diverting models utilizing available information from expert opinion and analysis described below may be utilized.

The present invention comprises two exemplary methods for determining parameter values using expert opinion and analysis, each of which is designed to enable parameter values to be determined utilizing a different subset of forms of information commonly available from expert opinion and analysis. In FIG. 4, these two exemplary methods comprise the same steps. As shown, a first set of equations that parameter values of the select model must satisfy is established using available information from expert opinion and analysis in step 404. Next in step 406, a very limited amount of available information from expert opinion and analysis about the conditional distributions of the uncertainty-based forecast is used to establish a second set of questions that the parameter values must satisfy. Together, these first and second sets of equations allow all parameter values to be determined. The two methods differ in that the first method utilizes available information from expert opinion and analysis about unconditional distributions of the uncertainty-based forecast to establish the first set of equations. In contrast, the second method utilizes available information from expert opinion and analysis about conditional distributions of the uncertainty-based forecast to establish the first set of equations. Both methods will now be discussed in detail.

For simplicity of presentation, the example formulas below are all presented for the following specific, discrete-time form of the locally mean-reverting-diverting family of models with time-varying parameters:

$$x_{t+1} - x_t = k_{t+1}(\bar{x}_{t+1} - x_t) + \sigma_{t+1}\epsilon_{t+1}$$

In this equation, $\epsilon_{t+1}$, is a standard normal random variable. Where not obvious, the variations in the methods presented below necessary to enable them to be applied to other models within the locally mean-reverting-diverting family of models are also described.

Under the first method, estimates of a mean and variance of each of the unconditional distributions of an uncertainty-based forecast are used to establish the first set of equations that the parameter values of the model must satisfy. These estimates may be provided directly from expert opinion or analysis, or may be calculated from estimates of the values of two or more percentiles of each such distribution. Specifically, if for a specific unconditional distribution $P_i$ is the value of percentile i, $\mu$ is the expected value, $\sigma$ is the standard deviation, and $NI(P_i)$ is the inverse of the standard normal distribution for percentile $P_i$, then $$P_1 = \mu + NI(P_1)\sigma$$

$$P_2 = \mu + NI(P_2)\sigma$$

More generally, as the linear nature of these equations makes clear, the necessary estimates of the mean $\mu$ and the volatility $\sigma$ can in fact be calculated given the values of any two of the four variables $\mu$, $\sigma$, and the two percentile values.

If the values of the mean $\mu$ and the volatility $\sigma$ are calculated from estimates of percentile values and estimates of three or more percentiles are available, their values may be inconsistent, meaning that no values of the mean $\mu$ and the volatility $\sigma$ may exist that are consistent with all of the percentile values. In this case, values for $\mu$ and $\sigma$ can be chosen by minimizing error between estimated percentile values available from expert opinion and analysis and percentile values calculated for a given pair of values for $\mu$ and $\sigma$. For example, if k percentile values are specified, optimal values for the mean and variance if a simple minimum squared error function is used can be found by solving the minimization problem below for $\mu$ and $\sigma$:

$$\min \sum_{i=1}^{k} [(\mu + NI(P_i)\sigma) - P_i]^2$$

Further, if the expert has greater confidence in some of the percentile values specified than in others, this relative degree of confidence may be reflected by adding weighting terms to the respective terms of the error function. For example, weighting variables $w_i$ are chosen in the following modified objective function:

$$\min \sum_{i=1}^{k} w_i [(\mu + NI(P_i)\sigma) - P_i]^2$$

Those skilled in the art will realize that similar methods can be used to identify a most appropriate set of expected value and volatility parameters if a combination of inconsistent estimates of percentile values, the expected value, the volatility, and/or other comparable information about the relevant distributions is specified.

A similar process can be followed for other models in the locally mean-reverting-diverting family of models that have different random terms. The equivalent process for lognormally distributed random terms is effectively identical, with the lognormal distribution substituted for the normal distribution, or alternatively by first applying a log-transformation and then utilizing the method above. When the random term contains both normal or lognormal and a jump term (e.g., Poisson arrival rate and normal, lognormal, or exponential jump size distribution), a number of input data points (e.g. percentiles or other parameters of the distribution) must equal or exceed a number of parameters to be identified. Given this data, a parallel parameter value determination process can be followed, including the use of an error function as necessary.

Once the expected value and volatility of the distribution of the uncertainty-based forecast at each point in time of interest have been determined, they can be used to construct equations that the remaining parameter values of the model must satisfy. Specifically, the volatility of the model between time t and t+1, denoted here as $\sigma_{t+1}$, must satisfy the following equation, which also includes the mean reversion-diversion coefficient k and the "cumulative" variance of the distribution of the uncertainty-based forecast at from time 0 to time t, or $\sigma_{0,t}$. Resultantly, equation #1 is:

$$\sigma_{0,t+1}^2 = (1-k_{t+1})^2 \sigma_{0,t}^2 + \sigma_{t+1}^2$$

This equation can be derived from the basic equation given above, or $$x_{t+1} - x_t = k_{t+1}(\bar{x}_{t+1} - x_t) + \sigma_{t+1}\epsilon_{t+1}$$

by first writing this out fully, assuming a known initial value at time 0, as:

$$x_t = k_t \bar{x}_t + \sum_{i=0}^{t-1}\left[\prod_{j=i+1}^{t}(1-k_j)\right]k_i\bar{x}_i + \sigma_t\tilde{\varepsilon}_t + \sum_{i=0}^{t-1}\left[\prod_{j=i+1}^{t}(1-k_j)\right]\sigma_i\tilde{\varepsilon}_i$$

Defining $$\alpha_t = k_t\bar{x}_t + \sum_{i=0}^{t-1}\left[\prod_{j=i+1}^{t}(1-k_j)\right]k_i\bar{x}_i \text{ and}$$

$$\tilde{\omega}_t = \sigma_t\tilde{\varepsilon}_t + \sum_{i=0}^{t-1}\left[\prod_{j=i+1}^{t}(1-k_j)\right]\sigma_i\tilde{\varepsilon}_i$$

then $x_t = \alpha_t + \omega_t$.

Expressing $\alpha_t$ and $\omega_t$ in their recursive form yields equations #2:

$$\alpha_{t+1} = (1-k_{t+1})\alpha_t + k_{t+1}\bar{x}_{t+1} \text{ and } \omega_{t+1} = (1-k_{t+1})\omega_t + \sigma_{t+1}\varepsilon_{t+1}.$$

Since each of the $\varepsilon_t$ is standard normal random variable, then $\omega_t$ is also normal with mean zero and variance given by $$\sigma_{0,t}^2 = \sigma_{x,t}^2 + \sum_{i=0}^{t-1}\left[\prod_{j=i+1}^{t}(1-k_j)^2\right]\sigma_i^2$$

or in its recursive form $\sigma_{0_{t+1}}^2 = (1-k_{t+1})^2\sigma_{0_t}^2 + \sigma_{t+1}^2$.

Together equations 1 and 2 above, which include three unknowns $\alpha_{t+1}$, $k_{t+1}$, and $\bar{x}_{t+1}$, represent the first set of equations generated by this method. Note that because $\kappa$ is squared in equation 1 and because $\kappa$ may be either positive or negative in a locally mean-reverting-diverting model, an additional constraint or equation (beyond a third equation that would yield three equations in three unknowns, one of them a second order polynomial) may be required to determine its sign and therefore uniquely determine its value.

In the second stage of the first method, one or more of the forms of information about the conditional distributions of an uncertainty-based forecast identified above is used to generate a third equation which the parameter values of the model must satisfy and, as necessary, information about the sign of the mean reversion coefficient $k_{t+1}$.

As an example of this approach, consider perhaps the simplest and most commonly available form of information about conditional distributions, an expected value of an uncertainty-based forecast at time t+1 conditional on a specific value of the variable at time t (which may be selected arbitrarily). The expectation of $x_{t+1}$ given that the value of the variable is $x_t$ at time t, is:

$$E[\tilde{x}_{t+1}|x_t] = k_{t+1}\bar{x}_{t+1} + (1-k_{t+1})x_t = c$$

This equation provides a sample third equation. Because both this equation and equation 1 are linear in $k_{t+1}$, utilizing these three equations the three required parameters at time t, $\sigma_{t+1}$, $k_{t+1}$, and $\bar{x}_{t+1}$, may be uniquely determined, including the sign of $k_{t+1}$, due to the linearity of the second and third equations in $k_{t+1}$. Solving these three equations for $\sigma_{t+1}$, $k_{t+1}$, and $\bar{x}_{t+1}$ yields:

$$k_{t+1} = 1 - \frac{\alpha_{t+1}}{c - \left(x_t + \sum_{i=0}^{t}\left[\prod_{j=i+1}^{t}(1-k_j)\right]k_i\bar{x}_i\right)}$$

$$\bar{x}_{t+1} = \frac{c - (1-k_{t+1})x_t}{k_{t+1}}$$

$$\sigma_{t+1}^2 = \sum_{i=0}^{t}\left[\prod_{j=i+1}^{t+1}(1-k_j)^2\right]\sigma_i^2 - \sigma_{0,t+1}^2$$

While the very limited amount of information about the conditional distributions of an uncertainty-based forecast required by this example approach can be estimated directly, the information may also be extracted from any of the forms of information about conditional distributions listed above.

If estimates of the conditional expectation for more than one prospective value of the uncertainty-based forecast are available, an error function or weighted error function approach of the kind described above can be utilized to identify the most appropriate set of parameter values.

Under the second method (i.e., utilizing only information about the conditional distributions of the uncertainty-based forecast), information about a type and amount of variability in variable values from one point in time to the next, or $\sigma$ in the example model form considered here, is assumed to be available. This uncertainty may be estimated by expert opinion and analysis of error data for one-period ahead forecasts, or other methods. For other models in the locally mean-reverting-diverting family the parameters that defined the random term may be established in a similar way.

Like the first method above, the second stage of the method utilizes information about the conditional expectation of the uncertainty-based forecast for specific variable values during the preceding period. An extremely simple approach for accomplishing this which requires a minimal amount of information is to estimate two conditional expectations (as done to establish the third equation in method 1 above) for two different prospective scenario values $x_t^1$ and $x_t^2$ at time t:

$$E[\tilde{x}_{t+1}|x_t^1] = k_{t+1}\bar{x}_{t+1} + (1-k_{t+1})x_t^1 = c_1$$

$$E[\tilde{x}_{t+1}|x_t^2] = k_{t+1}\bar{x}_{t+1} + (1-k_{t+1})x_t^2 = c_2$$

Solving these two equations for $\bar{x}_{t+1}$ and $k_{t+1}$ yields:

$$k_{t+1} = 1 - \frac{c_1 - c_2}{(x_t^1 - x_t^2)}$$

$$\bar{x}_{t+1} = \frac{c^2 - (1-k_{t+1})x_t^2}{k_{t+1}}$$

The basic form of these two equations is the same for all models in the locally mean-reverting-diverting family, although for some model forms the random terms will have non-zero expected values. These non-zero expected values can be incorporated by subtracting their expectations from the conditional expectations provided by expert opinion and analysis to arrive at the appropriate value of c in the equations above.

In a further embodiment, the most appropriate parameter values may also be determined when both directly relevant historical data and expert opinion and analysis are available. When both directly relevant historical data and expert opinion and analysis are available, both forms of information may be utilized depending on the type and amount of each form of information available, as described below.

When substantial amounts of information from both directly relevant historical data and expert opinion and analysis are available, necessary model parameter values may be determined using each type of information. After this is done, sets of parameter values calculated using each set of information may then be compared, as may a range of measures of the characteristics of the uncertainty-based forecasts generated by the model using each set of parameter values, as described in the section on performance testing and analysis below.

Discrepancies identified in either the parameter values or the performance measures of the uncertainty-based forecasts generated by the two calibration methods may be evaluated, and results used to revise one or both of the information sets used to determine the parameter values of the model.

Once this process is complete, the two sets of parameter values and/or the two uncertainty-based forecasts they may be used to generate may be utilized in a number of ways. For example, a user may choose to utilize only one set of results or to utilize both sets of results, in the later case forming a "portfolio" of uncertainty-based forecasts. When a portfolio of uncertainty-based forecasts is generated, each set of results may be equally weighted, or more weighting may be given to one set or results than the other, for example based on a user's relative level of confidence in the two sets of information from which they have been derived. Further, weights of this kind may be dynamically adjusted over time based on the relative performance of each set of parameter values over time, for example by using Bayesian methods, or through another method, for example based on a user's changing level of confidence in the information used to derive each set of parameter values over time.

Alternatively, when a substantial amount of directly relevant historical data is available but information available from expert opinion and analysis is insufficient to enable reliable determination of the parameter values of the model, the available information from expert opinion and analysis may be drawn upon to either refine the process of determining the parameter values of the model to the directly relevant historical data or to refine the uncertainty-based forecast generated using the model after its parameter values have been determined utilizing directly relevant historical data. Each of these possible uses of information available from expert opinion and analysis are described more fully below.

Specifically, information from expert opinion and analysis may either be used to "sort" or "condition" the directly relevant historical data before the model's parameter values are determined utilizing this type of information, or may serve as a basis for refining the representation of the uncertainty-based forecast generated by the model utilizing parameter values determined utilizing the full set of directly relevant historical data.

Furthermore, expert opinion and analysis may be utilized to "sort" or "condition" the full set of available directly relevant historical data in order to identify the subset of this data most relevant to the uncertainty-based forecast being constructed. For example, a relevant subset of the data may be from a related season of the year, specific stage of a product's lifecycle, generated under comparable economic conditions, etc. Once this "conditioned" subset of all directly relevant historical data has been identified, the methods described above for determining the parameter values of a model with directly relevant historical data may then be utilized directly.

Available information from expert opinion and analysis may also be utilized to refine the representation of an uncertainty-based forecast generated by a model with parameter values that have been determined using available directly relevant historical data. For example, the user may choose to retain and utilize only those values of the uncertainty-based forecast that lie within either some absolute or percentile range of the forecasted expected price, or to otherwise modify the uncertainty-based forecast in a manner that is viewed as increasing its consistency with the information available from expert opinion and analysis.

As a second example, a user may choose to utilize available information from expert opinion and analysis to modify an uncertainty-based forecast rather than to condition the set of directly relevant historical data if the amount of directly relevant historical data that would remain after the appropriate conditioning is insufficient to enable effective determination of the parameter values of the model. In cases of this kind the user may accordingly choose to either broaden the conditioning criteria or to utilize the information available from expert opinion and analysis to modify the uncertainty-based forecast generated using a broader set of directly relevant historical data, or some combination of both approaches.

In summary, limited amounts of information from expert opinion and analysis may be used either to condition the set of directly relevant historical data used to determine the parameter values of the model, to refine the uncertainty-based forecast generated using parameter values of the model determined using some or all available directly relevant historical data, or some combination of both approaches. To select between these alternative approaches, users may consider the nature of the information available from expert opinion and analysis, the overall amount of directly relevant historical information available, and the amount of directly relevant historical data that satisfies specific conditioning criteria that may defined utilizing information available from expert opinion and analysis.

When a substantial amount of information is available from expert opinion and analysis but only limited information is available from directly relevant historical data, the available directly relevant historical data may also be utilized either before or after the parameter values of the relevant model are determined using information available from expert opinion and analysis.

For example, information available from directly relevant historical data may be used before the parameter values of the process are determined using information available from expert opinion and analysis to generate estimates of properties of the uncertainty-based forecast (although such estimates may be of limited statistical validity due to the number of data points available), such as its minimum, maximum, average and percentile values at individual points in time, or cumulatively over periods of time, the autocorrelation of variable values over time, etc. If these values diverge from, or more significantly are inconsistent with, related estimates from expert opinion and analysis, the user may wish to conduct further analysis of either the information available from directly relevant historical data and/or the information available from expert opinion and analysis.

Information available from directly relevant historical data may also be utilized after the parameter values of the model have been determined using information available from expert opinion and analysis, for example to assess the consistency of the information available from directly relevant historical data with related properties of the uncertainty-based forecast generated by the model with the determined parameter values. Thus in this case, rather than calculating properties of the directly relevant historical data for comparison with the information available from expert opinion and analysis, these properties are compared with properties of the uncertainty-based forecast generated by the relevant model when its parameter values have been determined using information available from expert opinion and analysis.

For example, various performance measures of an uncertainty-based forecast may be compared to similar measures calculated from the directly relevant historical data, to the extent the later is possible given the nature and the amount of the directly relevant historical data that is available. If discrepancies exist, the relevant characteristics of the uncertainty-based forecast may be changed to partially or completely mitigate them. The user may wish to base such a decision to partially or completely mitigate any such discrepancies on his or her relative level of confidence in the two sources of available information, including the sample size of the available directly relevant historical data. For example, if three directly relevant historical data series are available and the maximum value of these series in a given period exceeds the largest value of the uncertainty-based forecast in that period, the user may choose to review the information available from expert opinion and analysis and/or the directly relevant historical data, or to modify the relevant characteristics of the uncertainty-based forecast. Additionally, before proceeding, a user may wish to evaluate the feasibility of achieving greater consistency between the relevant characteristics of the uncertainty-based forecast and those of the directly relevant historical data given the representational capabilities of the model being used to represent the uncertainty-based forecast.

Once determined using one or more of the methods described above, parameter values are then stored in the model and parameter values storage 308 (FIG. 3).

Once the most appropriate model form (step 304) and parameter values of this model form have been successfully determined (step 306) and both have been stored (step 308), the user may choose to run the model multiple times (step 206) (FIG. 2) to generate and output multiple alternative representations of the uncertainty-based forecast for various purposes that may arise over time.

The output may be displayed to the user via various display formats. For example, the user may choose to display the data in the form of a chart, a graph, or any other display format suitable for use with the present invention. For instance, a statistical analysis of the data may be displayed. As previously discussed, the user may access the output representation of the uncertainty-based forecast displayed in order to manipulate data, access the data generally, etc.

In referring back to FIG. 2, a final, optional step 210 (FIG. 2) is to evaluate the characteristics of the representation of the uncertainty-based forecast that has been generated for accuracy and appropriateness, for example relative to available information from directly relevant historical data and expert opinion and analysis.

This section describes a representative range of the tests that may be used to evaluate such performance of an uncertainty-based forecast in step 210 (FIG. 2). The tests consist of analyses of the key characteristics of the unconditional and conditional distributions of the uncertainty-based forecast. In the tests, the relevant properties of these distributions are compared to the best available estimates of the desired values of these properties, as determined for example from available information from directly relevant historical data and/or expert opinion and analysis.

The tests described below are grouped into those that address the unconditional distributions of an uncertainty-based forecast and those that address the conditional distributions of the uncertainty-based forecast.

The primary measures of the unconditional distributions of an uncertainty-based forecast include the values of the percentiles, the moments, including expected value, variance, and higher moments, and other related statistical measures of the distribution of variable values at individual points in time. Confidence intervals for each of these measures may also be calculated by using the calibrated model to repeatedly generate representations of the uncertainty-based forecast, calculating the relevant measures for each such representation, and using the distribution of the set of sample values produced to determine a confidence interval for each such measure.

A similar analysis process may be applied to subsets of all values of the uncertainty-based forecast, with such subsets constructed to meet specific criteria. For example, portions on an uncertainty-based forecast with average values or cumulative values within a specified range may be selected and analyzed.

Any measure of the kind described here may be presented in tabular form, or one or more of such measure may be presented graphically. In either case their values may be presented for an individual point in time, or for the evolution of their values over a period of time.

Measures of how variable values evolve over time may be divided into measures of the characteristics of individual sample paths over time, and measures of one or more specific conditional distributions of an uncertainty-based forecast.

Measures of the characteristics of how individual sample paths evolve over time include the variance of either the absolute or the percentage changes in the variable values along a sample path, the sum or average of these values over time, and properties of the distribution of any such values across all or a selected subset of all sample paths of a representation of an uncertainty-based forecast (e.g. percentiles, expected value, variance, minimum, maximum, other moments of the distribution, etc.). Each of these measures may be calculated for the entire forecast period, or for any sub-interval thereof.

As discussed above, measures of the characteristics of a conditional distribution include its mean, variance, percentiles, minimums and maximums, and related statistical measures. As also discussed above, conditional distributions may be evaluated for periods of any length, and based on any specific variable values at a particular point in time in the forecast interval, or sequence of prior variable values.

Figure 5:
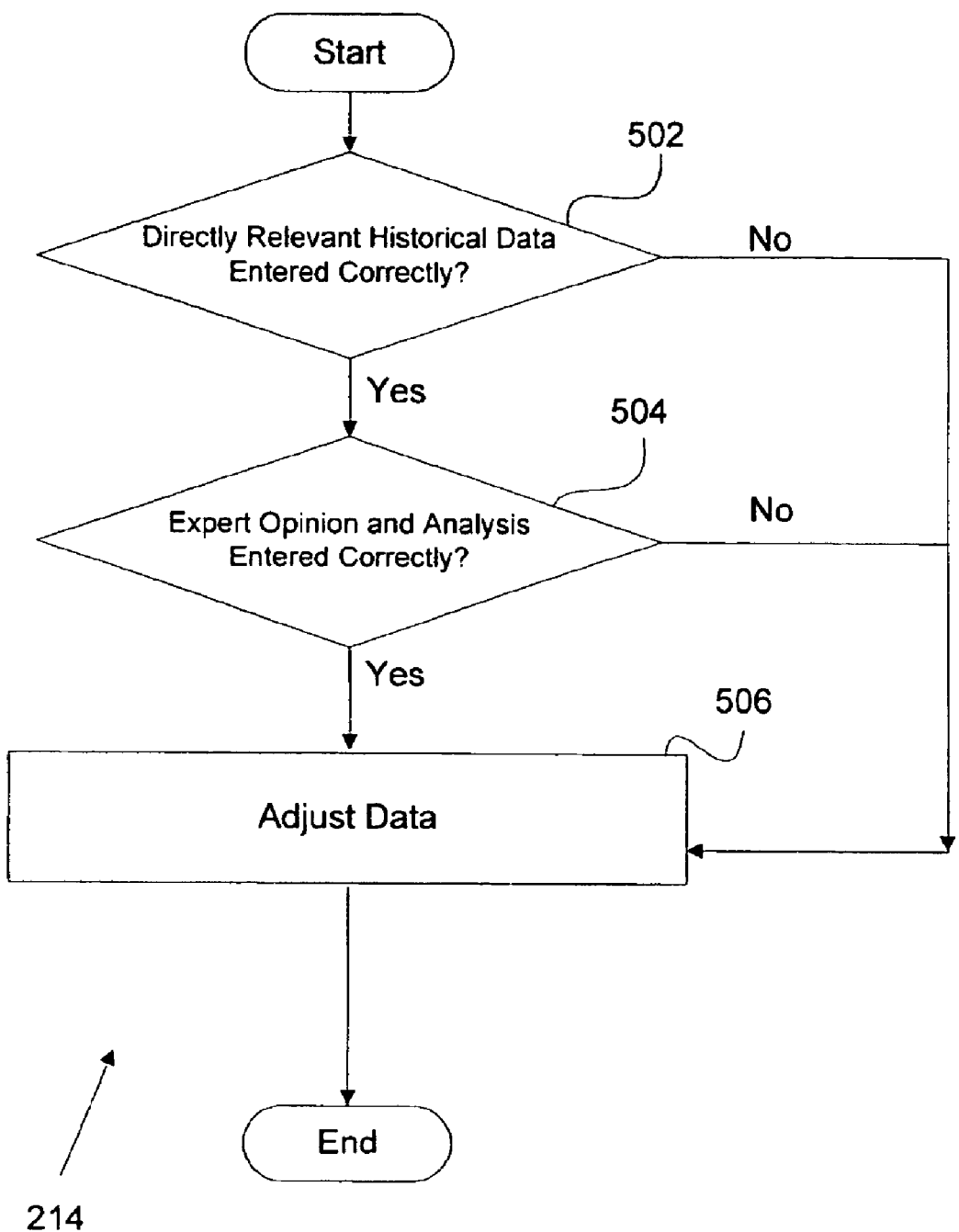
FIG. 5 is an exemplary flowchart of a method for reviewing and refining input data.

Referring now to FIG. 5, an exemplary process for reviewing and/or refining the input data (step 214 of FIG. 2) is shown in greater detail. Initially, the user determines whether the representation of the uncertainty-based forecast presented is acceptable in step 210 (FIG. 2). If the representation of the uncertainty-based forecast is not acceptable, the user may check to determine whether directly relevant historical data has been entered correctly in step 502. If the directly relevant historical data has been entered correctly, the user may next check to determine whether expert opinion and analysis data is entered correctly in step 504. In alternative embodiments, steps 502 and 504 may be performed in reverse order. If both the directly relevant historical data (step 502) and the expert opinion and analysis data (step 504) have been entered correctly, the user may request modification of the directly relevant historical data, or that the expert adjusts data in step 506, or may select an alternative model that may be more appropriate. The additional or modified data is then input in step 202 (FIG. 2). Similarly, if the directly relevant historical data or expert opinion and analysis data has not been entered correctly, the added, modified, or otherwise corrected data, may be input in step 202. Subsequently, new representation of the uncertainty-based forecast is generated.

In summary, a system and method for representing and incorporating available information into uncertainty-based forecasts is provided. Uncertain sequences of future events often occur in many contexts, and the ability to efficiently and effectively represent these sequences and incorporate all available information about them into such representations has great practical value. The user provides data, with whatever level of certainty the user may have (e.g., directly relevant historical data), as well as expert opinion and analysis data. The data is then processed and fit to a model either selected automatically by the system or selected directly by the user.

The present invention is comprised of a new class of models able to efficiently and effectively represent uncertainty-based forecasts with a wide range of characteristics with greater accuracy than previously possible, and of methods of selecting the most appropriate model from this class and determining the most appropriate parameter values of the selected model to all available data, including both directly relevant historical data and/or expert opinion and analysis. The output is a model that can be used to generate representations of the uncertainty-based forecast comprised of an arbitrary number of scenarios or sample paths for the variable or variables of interest accurately and efficiently. In addition, methods for testing and refining the output representation of the uncertainty-based forecast are provided.

The invention has been described with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A computer implemented system for representing and incorporating available information into uncertainty-based forecasts comprising:
   a model module configured for providing at least one locally mean-reverting-diverting model;
   a parameter module configured for providing parameter values of the at least one model; and
   a data processing module configured for utilizing the at least one model and the parameter values to create an uncertainty-based forecast.

2. The system of claim 1 further comprising a data cleanup module configured for refining the available information.

3. The system of claim 1 wherein the model module is further configured for automating the selection of the at least one locally mean-reverting-diverting model utilizing the available information.

4. The system of claim 1 wherein the parameter module is further configured for automating the determination of the parameter values of the at least one locally mean-reverting-diverting model utilizing the available information.

5. The system of claim 1 wherein the available information is directly relevant historical data.

6. The system of claim 1 wherein the available information is expert opinion and analysis.

7. The system of claim 1 wherein the available information is both directly relevant historical data and expert opinion and analysis.

8. The system of claim 1 further comprising refining the available information prior to selecting the at least one model.

9. The system of claim 1 further comprising refining the available information after generating the uncertainty-based forecast in order to refine the uncertainty-based forecast.

10. The system of claim 1 further comprising evaluating characteristics of uncertainty-based forecast that has been generated for accuracy and appropriateness relative to the available information.

11. The system of claim 1 further comprising model and parameter storage.

12. A computer implemented method for representing and incorporating available information into uncertainty-based forecast comprising:
   receiving the available information; selecting at least one locally mean-reverting-diverting model;
   selecting parameter values of the at least one model; and
   generating the uncertainty-based forecast.

13. The method of claim 12 wherein the selection of the at least one locally mean-reverting-diverting model is automated utilizing the available information.

14. The method of claim 12 wherein the determination of the parameter values of the at least one locally mean-reverting-diverting model is automated utilizing the available information.

15. The method of claim 12 wherein the available information is directly relevant historical data.

16. The method of claim 12 wherein the available information is expert opinion and analysis.

17. The method of claim 12 wherein the available information is both directly relevant historical data and expert opinion and analysis.

18. The method of claim 12 further comprising refining the available information prior to selecting the at least one model.

19. The method of claim 12 further comprising refining the available information after generating the uncertainty-based forecast in order to refine the uncertainty-based forecast.

20. The method of claim 12 further comprising evaluating characteristics of uncertainty-based forecast that has been generated for accuracy and appropriateness relative to the available information.

21. A computer readable medium having embodied thereon a program, the program being executable by a machine to represent and incorporate available information into uncertainty-based forecast comprising: receiving the available information; selecting at least one locally mean-reverting-diverting model; selecting parameter values for the at least one model; and generating the uncertainty-based forecast.

22. The computer readable medium of claim 21 wherein selecting the parameter values further comprises automating the determination of the parameter values of the at least one model utilizing the available information.

23. A computer implemented method for determining the parameter values of the at least one locally mean-reverting-diverting model utilizing available information from expert opinion and analysis comprising:
   identifying a form of the available information from expert opinion and analysis;
   establishing a first set of equations of which parameter values of the at least one locally mean-reverting-diverting model must satisfy using the available information from expert opinion and analysis;
   establishing a second set of equations of which the parameter values of the at least one locally mean-reverting-diverting model must satisfy using the available information from expert opinion and analysis about conditional distributions of an uncertainty-based forecast; and determining the parameter values of the at least one locally mean-reverting-diverting model utilizing the first and second set of equations.

24. The method of claim 23 wherein establishing the first set of equations further comprises utilizing the available information from expert opinion and analysis about unconditional distributions of the uncertainty-based forecast.

25. The method of claim 23 wherein establishing the first set of equations further comprises utilizing the available information from expert opinion and analysis about conditional distributions of the uncertainty-based forecast.

26. A computer readable medium having embodied thereon a program, the program being executable by a machine to determine the parameter values of at least one locally mean-reverting-diverting model with available information from expert opinion and analysis comprising: identifying a form of the available information from expert opinion and analysis; establishing a first set of equations of which parameter values of the at least one locally mean-reverting-diverting model must satisfy using the available information from expert opinion and analysis; establishing a second set of equations of which the parameter values of the at least one locally mean-reverting-diverting model must satisfy using the available information from expert opinion and analysis about conditional distributions of an uncertainty-based forecast; and determining the parameter values of the at least one locally mean-reverting-diverting model utilizing the first and second set of equations.

* * * * *